(12) United States Patent  
Auger et al.

(10) Patent No.: US 12,088,911 B1
(45) Date of Patent: Sep. 10, 2024

(54) SYSTEMS AND METHODS FOR CAPTURING VISUAL CONTENT USING CELESTIAL POLE (71) Applicant: GoPro, Inc., San Mateo, CA (US)

(72) Inventors: Michel Auger, Paris (FR); Nicolas Chesné, Verneuil sur Seine (FR); Shreenivasan Manievannan, Pacifica, CA (US)

(73) Assignee: GoPro, Inc., San Mateo, CA (US)

( * ) Notice: Subject to any disclaimer, the term of this patent is extended or adjusted under 35 U.S.C. 154(b) by 36 days.

(21) Appl. No.: 18/173,645

(22) Filed: Feb. 23, 2023

(51) Int. Cl.
H04N 23/60 (2023.01)
G01C 21/00 (2006.01)
H04N 23/51 (2023.01)
H04N 23/53 (2023.01)
H04N 23/63 (2023.01)

(52) U.S. Cl.
CPC .......... *H04N 23/64* (2023.01); *G01C 21/005* (2013.01); *H04N 23/51* (2023.01); *H04N 23/53* (2023.01); *H04N 23/632* (2023.01); *H04N 23/635* (2023.01)

(58) Field of Classification Search
CPC ........ H04N 23/64; H04N 23/35; H04N 23/51; H04N 23/53; H04N 23/632; G01C 21/005
See application file for complete search history.

(56) References Cited

U.S. PATENT DOCUMENTS

| | | | | |
|---|---|---|---|---|
| 5,617,332 A | * | 4/1997 | Fressola | G06T 15/00 |
| | | | | 348/E13.059 |
| 9,538,061 B1 | * | 1/2017 | Serban | G06Q 50/14 |
| 11,043,132 B1 | * | 6/2021 | Aucoin | G01C 21/20 |
| 11,153,503 B1 | * | 10/2021 | Ebrahimi Afrouzi | H04N 23/74 |
| 2007/0100542 A1 | * | 5/2007 | Courtney | G01C 25/00 |
| | | | | 701/532 |
| 2009/0325607 A1 | * | 12/2009 | Conway | H04W 4/20 |
| | | | | 455/456.3 |
| 2012/0290950 A1 | * | 11/2012 | Rapaport | H04L 12/1818 |
| | | | | 715/753 |
| 2013/0162835 A1 | * | 6/2013 | Forland | H04N 23/11 |
| | | | | 348/E5.09 |
| 2013/0233996 A1 | * | 9/2013 | Taylor | F16M 11/2035 |
| | | | | 248/550 |
| 2016/0033272 A1 | * | 2/2016 | Struckhoff | G01C 21/005 |
| | | | | 356/4.01 |
| 2017/0034403 A1 | * | 2/2017 | Seo | H04N 23/62 |
| 2017/0254647 A1 | * | 9/2017 | Nozawa | G04G 3/00 |
| 2017/0268882 A1 | * | 9/2017 | Bellora | G01C 21/02 |
| 2019/0219398 A1 | * | 7/2019 | Sun | G01C 21/10 |
| 2020/0233055 A1 | * | 7/2020 | Xu | G01C 25/00 |

* cited by examiner

Primary Examiner — Amy R Hsu
(74) Attorney, Agent, or Firm — Esplin & Associates, PC (57) ABSTRACT An image capture device may capture visual content with an optical element having a field of view. The location of the image capture device, the direction of north with respect to the image capture device, and rotation of the image capture device may be used to determine location of celestial pole with respect to the field of view. A graphical user interface may be presented on an electronic display. The graphical user interface may indicate the location of the celestial pole within the field of view.

20 Claims, 7 Drawing Sheets

FIG. 5B graphical user interface 600

FIG. 6A graphical user interface 600

SYSTEMS AND METHODS FOR CAPTURING VISUAL CONTENT USING CELESTIAL POLE

FIELD

This disclosure relates to user interface that facilitates capturing visual content using celestial pole.

BACKGROUND

A user may wish to capture image(s) and/or video(s) of the sky including the celestial pole. For example, a user may wish to capture a starry trail image/video. Finding and locating the celestial pole within the image(s)/video(s) to be captured may be difficult.

SUMMARY

This disclosure relates to capturing visual content using celestial pole. An image capture device may include one or more of an electronic display, an image sensor, an optical element, a rotational position sensor, a location sensor, a north-direction sensor, a processor, and/or other components. The image sensor may generate a visual output signal conveying visual information based on light that becomes incident thereon. The visual information may define visual content. The optical element may guide light within a field of view to the image sensor. The field of view may have a size. The rotational position sensor may generate a rotational position output signal conveying rotational position information. The rotational position information may characterize rotational position of the image capture device. The location sensor may generate a location output signal conveying location information. The location information may characterize location of the image capture device. The north-direction sensor may generate a north-direction output signal conveying north-direction information. The north-direction information may characterize direction of north with respect to the image capture device.

Location of celestial pole with respect to the field of view may be determined based on the location of the image capture device, the direction of north with respect to the image capture device, the rotational position of the image capture device, the size of the field of view, and/or other information. Presentation of a graphical user interface on the electronic display may be effectuated. The graphical user interface may include a celestial pole element that indicates the location of celestial pole within the field of view.

A housing may carry one or more components of the image capture device. The housing may carry (be attached to, support, hold, and/or otherwise carry) one or more of an electronic display, an image sensor, an optical element, a rotational position sensor, a location sensor, a north-direction sensor, a processor, and/or other components.

The electronic display may be configured to present information. The electronic display may be configured to present one or more graphical user interfaces.

The electronic storage may store information relating to image capture device, visual information, information relating to visual content, information relating to optical element, information relating to field of view, rotational position information, information relating to rotational position of image capture device, location information, information relating to location of image capture device, north-direction information, information relating to direction of north with respect to image capture device, information relating to celestial pole, information relating to graphical user interface, and/or other information.

The image sensor may be configured to generate a visual output signal and/or other output signals. The visual output signal may convey visual information based on light that becomes incident on the image sensor and/or other information. The visual information may define visual content.

The optical element may be configured to guide light within a field of view to the image sensor. The field of view may have a size. The field of view may be less than 180 degrees. The field of view may be equal to 180 degrees. The field of view may be greater than 180 degrees.

The rotational position sensor may be configured to generate a position output signal and/or other output signals. The position output signal may convey rotational position information of the image capture device. The rotational position information may characterize rotational position of the image capture device. In some implementations, the rotational position sensor may include an accelerometer, a gyroscope, an inertial measurement unit, and/or other rotational position sensor.

The location sensor may be configured to generate a location output signal and/or other output signals. The location output signal may convey location information of the image capture device. The location information may characterize location of the image capture device. In some implementations, the location sensor may include a Global Positioning System sensor and/or other location sensor.

The north-direction sensor may be configured to generate a north-direction output signal and/or other output signals. The north-direction output signal may convey north-direction information of the image capture device. The north-direction information may characterize direction of north with respect to the image capture device. In some implementations, the north-direction sensor may include a magnetometer and/or other north-direction sensor.

The processor(s) may be configured by machine-readable instructions. Executing the machine-readable instructions may cause the processor(s) to facilitate capturing visual content using celestial pole. The machine-readable instructions may include one or more computer program components. The computer program components may include one or more of a location component, a graphical user interface component, and/or other computer program components.

The location component may be configured to determine location of the celestial pole with respect to the field of view of the optical element. The location of the celestial pole with respect to the field of view of the optical element may be determined based on the location of the image capture device, the direction of north with respect to the image capture device, the rotational position of the image capture device, the size of the field of view, and/or other information.

In some implementations, determination of the location of the celestial pole with respect to the field of view of the optical element may include: (1) determination of orientation of the celestial pole with respect to the housing based on the location of the housing, the direction of north with respect to the housing, and/or other information; and (2) determination of the location of the celestial pole with respect to the field of view based on the orientation of the celestial pole with respect to the housing, the rotational position of the housing, the size of the field of view, and/or other information.

The graphical user interface component may be configured to effectuate presentation of one or more graphical user interfaces on the electronic display. The graphical user interface(s) may include a celestial pole element and/or other interface elements. The celestial pole element may indicate the location of the celestial pole within the field of view of the optical element. In some implementations, the celestial pole element may include a dot or a circle positioned on the visual content to visually represent the location of the celestial pole within the field of view of the optical element.

In some implementations, the graphical user interface may include a direction element in place of the celestial pole element based on the location of the celestial pole outside the field of view. The direction element may indicate direction of the location of the celestial pole outside the field of view.

In some implementations, the graphical user interface may further include multiple circle elements of different sizes. The multiple circle elements may be centered on the location of the celestial pole within the field of view.

In some implementations, the graphical user interface may further include simulated star trail elements for stars within the field of view. The simulated star trail elements may simulate trailing of the stars around the location of the celestial pole within the field of view.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
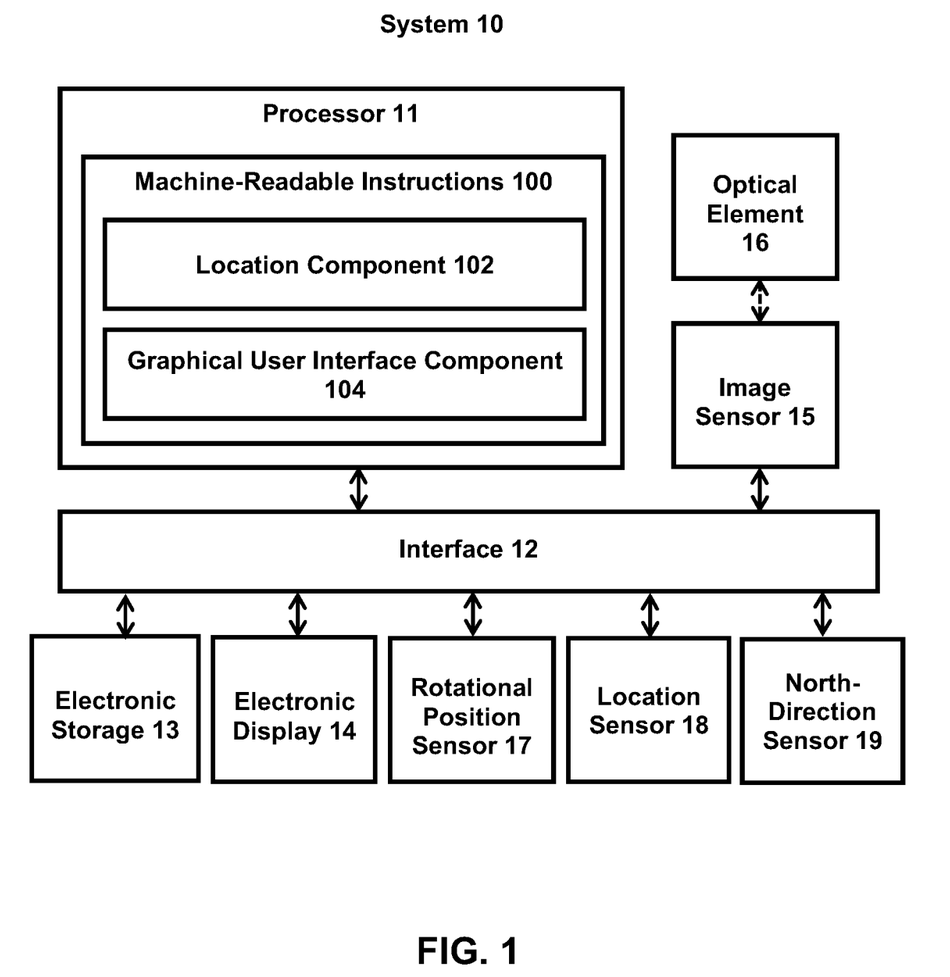
FIG. 1 illustrates an example system for capturing visual content using celestial pole.

FIG. 1 illustrates a system 10 for capturing visual content using celestial pole. The system 10 may include one or more of a processor 11, an interface 12 (e.g., bus, wireless interface), an electronic storage 13, an electronic display 14, an image sensor 15, an optical element 16, a rotational position sensor 17, a location sensor 18, a north-direction sensor 19, and/or other components. The image sensor 15 may generate a visual output signal conveying visual information based on light that becomes incident thereon. The visual information may define visual content. The optical element 16 may guide light within a field of view to the image sensor 15. The field of view may have a size. The rotational position sensor 17 may generate a rotational position output signal conveying rotational position information. The rotational position information may characterize rotational position of an image capture device. The location sensor 18 may generate a location output signal conveying location information. The location information may characterize location of the image capture device. The north-direction sensor 19 may generate a north-direction output signal conveying north-direction information. The north-direction information may characterize direction of north with respect to the image capture device.

Location of celestial pole with respect to the field of view may be determined by the processor 11 based on the location of the image capture device, the direction of north with respect to the image capture device, the rotational position of the image capture device, the size of the field of view, and/or other information. Presentation of a graphical user interface on the electronic display may be effectuated by the processor 11. The graphical user interface may include a celestial pole element that indicates the location of celestial pole within the field of view.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to image capture device, visual information, information relating to visual content, information relating to optical element, information relating to field of view, rotational position information, information relating to rotational position of image capture device, location information, information relating to location of image capture device, north-direction information, information relating to direction of north with respect image capture device, information relating to celestial pole, information relating to graphical user interface, and/or other information.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the electronic display 14, the image sensor 15, the optical element 16, the rotational position sensor 17, the location sensor 18, and/or the north direction sensor 19 of the system 10 may be carried by the housing of the image capture device. The housing may carry other components, such as the processor 11 and/or the electronic storage 13. References to a housing of an image capture device may refer to the image capture device, and vice versa.

Figure 3:
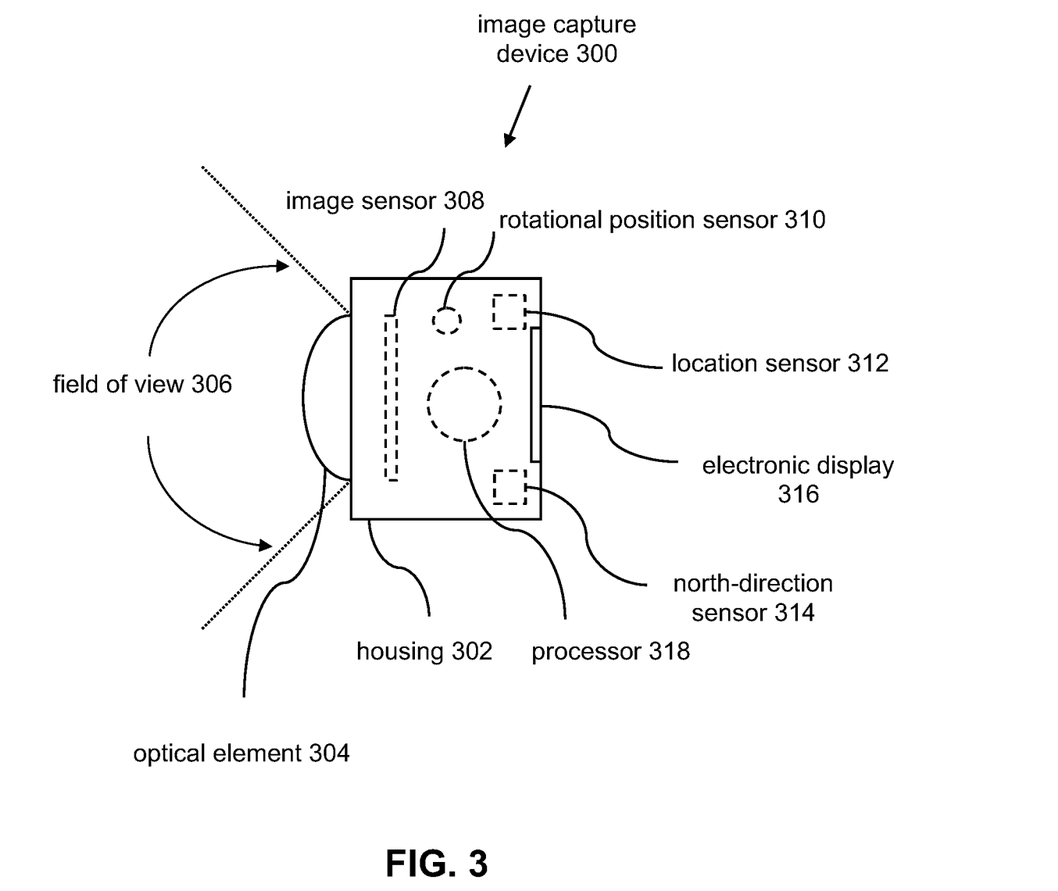
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet). FIG. 3 illustrates an example image capture device 300. Visual content (e.g., of image(s), video frame(s)) may be captured by the image capture device 300. The image capture device 300 may include a housing 302. The housing 302 may refer a device (e.g., casing, shell) that covers, protects, and/or supports one or more components of the image capture device 300. The housing 302 may include a single-piece housing or a multi-piece housing. The housing 302 may carry (be attached to, support, hold, and/or otherwise carry) one or more of an optical element 304, an image sensor 308, a rotational position sensor 310, a location sensor 312, a north-direction sensor 314, an electronic display 316, a processor 318, and/or other components.

One or more components of the image capture device 300 may be the same as, be similar to, and/or correspond to one or more components of the system 10. For example, the optical element 304 may be the same as, be similar to, and/or correspond to the optical element 16. The image sensor 308 may be the same as, be similar to, and/or correspond to the image sensor 15. The rotational position sensor 310 may be the same as, be similar to, and/or correspond to the rotational position sensor 17. The location sensor 312 may be the same as, be similar to, and/or correspond to the location sensor 18. The north-direction sensor 314 may be the same as, be similar to, and/or correspond to the north-direction sensor 19. The electronic display 316 may be the same as, be similar to, and/or correspond to the electronic display 13. The processor 318 may be the same as, be similar to, and/or correspond to the processor 11. The image capture device 300 may include other components not shown in FIG. 3. The image capture device 300 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 306. The optical element 304 may be configured to guide light within the field of view 306 to the image sensor 308.

The field of view 306 may include the field of view of a scene that is within the field of view of the optical element 304 and/or the field of view of the scene that is delivered to the image sensor 308. For example, the optical element 304 may guide light within its field of view to the image sensor 308 or may guide light within a portion of its field of view to the image sensor 308. The field of view of 306 of the optical element 304 may refer to the extent of the observable world that is seen through the optical element 304. The field of view may have a size. The size of field of view 306 of the optical element 304 may include one or more angles (e.g., vertical angle, horizontal angle, diagonal angle) at which light is received and passed on by the optical element 304 to the image sensor 308. In some implementations, the field of view 306 may be greater than 180-degrees. In some implementations, the field of view 306 may be equal to 180-degrees. In some implementations, the field of view 306 may be smaller than 180-degrees.

In some implementations, the image capture device 300 may include multiple optical elements. For example, the image capture device 300 may include multiple optical elements that are arranged on the housing 302 to capture spherical images/videos (guide light within spherical field of view to one or more images sensors). For instance, the image capture device 300 may include two optical elements positioned on opposing sides of the housing 302. The fields of views of the optical elements may overlap and enable capture of spherical images and/or spherical videos.

The image sensor 308 may include sensor(s) that converts received light into output signals. The output signals may include electrical signals. The image sensor 308 may generate output signals conveying information that defines visual content of one or more images and/or one or more video frames of a video. For example, the image sensor 308 may include one or more of a charge-coupled device sensor, an active pixel sensor, a complementary metal-oxide semiconductor sensor, an N-type metal-oxide-semiconductor sensor, and/or other image sensors.

The image sensor 308 may be configured generate output signals conveying information that defines visual content of one or more images and/or one or more video frames of a video. The image sensor 308 may be configured to generate a visual output signal and/or other output signals. The visual output signal may convey visual information based on light that becomes incident on the image sensor 308 and/or other information. The visual output signal may convey visual information that defines visual content having a field of view. The optical element 304 may be configured to guide light within the field of view 306 to the image sensor 308, and the image sensor 308 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 308 may include conversion of light received by the image sensor 308 into output signals/visual information defining visual content. Capturing visual content may include recording, storing, and/or otherwise capturing the visual content for use in generating video content (e.g., content of video frames). For example, during a capture duration, the visual output signal generated by the image sensor 308 and/or the visual information conveyed by the visual output signal may be used to record, store, and/or otherwise capture the visual content for use in generating video content.

In some implementations, the image capture device 300 may include multiple image sensors. For example, the image capture device 300 may include multiple image sensors carried by the housing 302 to capture spherical images/videos based on light guided thereto by multiple optical elements. For instance, the image capture device 300 may include two image sensors configured to receive light from two optical elements positioned on opposing sides of the housing 302. The fields of views of the optical elements may overlap and enable capture of spherical images and/or spherical videos.

The rotational position sensor 310 may include sensor(s) that measures experienced rotational positions and/or rotational motions. The rotational position sensor 310 may convert experienced rotational positions and/or rotational motions into output signals. The output signals may include electrical signals. The rotational position sensor 310 may include one or more accelerometers, one or more gyroscopes, one or more inertial measurement units, and/or other rotational position sensor(s). The rotational position sensor 310 may generate output signals conveying information that characterizes rotational positions and/or rotational motions of the rotational position sensor 310 and/or device(s) carrying the rotational position sensor 310, such as the image capture device 300 and/or the housing 302.

For example, the rotational position sensor 310 may be configured to generate a position output signal based on rotational positions of the image capture device 300 during the capture duration. The position output signal may convey rotational position information of the image capture device 300. The rotational position information may characterize rotational position of the image capture device 300 at different moments (points in time, time durations) within the capture duration.

The rotational position information may characterize rotational positions of the image capture device 300 based on specific rotational positions of the image capture device 300 and/or based on changes in rotational positions of the image capture device 300 as a function of progress through the capture duration. That is, the rotational position information may characterize rotational positions of the image capture device 300 and/or changes in rotational positions (motion) of the image capture device 300 (e.g., direction, amount, velocity, acceleration) during the capture duration.

The rotational position information may characterize and/or be used to determine the tilt of the image capture device 300. Tilt of the image capture device 300 may refer to the extent to which image capture device 300 is in a sloping position. Tilt of the image capture device 300 may include rotation of the image capture device about its roll axis, its pitch axis, and/or other axes. For example, the rotational position information may include the direction of gravity on the image capture device 300 when visual content is captured at different moments within the capture duration, information on the amount of angle by which the image capture device 300 is tilted with respect to horizon (e.g., tilted above or below the horizon, tilted to the right or left of the horizon), and/or other information that characterizes and/or may be used to determine the tilt of the image capture device 300 (e.g., offset of the image capture device axis with respect to the horizon).

The location sensor 312 may include sensor(s) that measures location. The location sensor 312 may convert experienced locations into output signals. The output signals may include electrical signals. The location sensor 312 may include one or more Global Positioning System sensors and/or other location sensor(s). The location sensor 310 may generate output signals conveying information that characterizes location of the location sensor 312 and/or device(s) carrying the location sensor 312, such as the image capture device 300 and/or the housing 302.

For example, the location sensor 312 may be configured to generate a location output signal based on position of the location sensor 312 on Earth and/or communication with other device(s) (e.g., communication with GPS devices). The location output signal may convey location information of the image capture device 300. The location information may characterize location of the image capture device 300 at different moments (points in time, time durations) within the capture duration.

The north-direction sensor 314 may include sensor(s) that measures direction of north (e.g., geographic north, magnetic north). The north-direction sensor 314 may convert direction of north into output signals. The output signals may include electrical signals. The north-direction sensor 314 may include one or more magnetometers and/or other north-direction sensor(s). The north-direction sensor 314 may generate output signals conveying information that characterizes direction of north with respect to the north-direction sensor 314 and/or device(s) carrying the north-direction sensor 314, such as the image capture device 300 and/or the housing 302.

For example, the north-direction sensor 314 may be configured to generate a north-direction output signal based on direction of north with respect to its present orientation. The north-direction output signal may convey north-direction information of the image capture device 300. The north-direction information may characterize direction of north with respect to the image capture device 300 (orientation of the image capture device 300) at different moments (points in time, time durations) within the capture duration. The direction of north with respect to the image capture device 300 may include in what direction and/or by what amount (e.g., angle) the image capture device 300 is pointed away from the direction of north, or vice versa.

The electronic display 316 may refer to an electronic device that provides visual presentation of information. The electronic display 316 may include a color display and/or a non-color display. In some implementations, the electronic display 316 may include one or more touchscreen displays. The electronic display 316 may be configured to present information. The electronic display 316 may be configured to visually present information. The electronic display may be configured to present one or more graphical user interfaces, visual content, and/or other information. The graphical user interface may enable a user to interact with the image capture device 300 and/or see information provided by the image capture device 300.

While the image capture device 300 is shown as having one electronic display, this is merely as an example and is not meant to be limiting. In some implementations, the image capture device may include multiple electronic displays. For example, the image capture device 300 may include a rear-facing electronic display (e.g., the electronic display 316) and a front-facing electronic display. Other arrangements of electronic displays are contemplated.

The processor 310 may include one or more processors (logic circuitry) that provide information processing capabilities in the image capture device 300. The processor 310 may provide one or more computing functions for the image capture device 300. The processor 310 may operate/send command signals to one or more components of the image capture device 300 to operate the image capture device 300. For example, the processor 310 may facilitate operation of the image capture device 300 in capturing image(s) and/or video(s), facilitate operation of the optical element 304 (e.g., change how light is guided by the optical element 304), facilitate operation of the image sensor 308 (e.g., change how the received light is converted into information that defines images/videos and/or how the images/videos are post-processed after capture), and/or facilitate operation of the electronic display 316.

The processor 310 may obtain information from the image sensor 308, the rotational position sensor 310, the location sensor 312, and/or the north-direction sensor 314 and/or facilitate transfer of information from the image sensor 308, the rotational position sensor 310, the location sensor 312, and/or the north-direction sensor 314 to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

The image capture device 300 may capture visual content during a capture duration. The visual content captured by the image capture device 300 may be presented on the electronic display 316. The location of the image capture device 300, the rotational position (tilt) of the image capture device 300, the direction of north with respect to the image capture device 300, and the size of the field of view 306 may be used to determine location of celestial pole with respect to the field of view 306. The celestial pole may refer to a point in the sky around which the stars and planets appear to rotate. The celestial pole may refer to a point in the sky where the Earth's axis of rotation intersects the celestial sphere. In some implementations, the celestial pole may refer to and/or include the North Star.

The location of the image capture device 300, the rotational position of the image capture device 300, the direction of north with respect to the image capture device 300, and the size of the field of view 306 may be used to determine whether the celestial pole is within or outside the field of view 306. The location of the image capture device 300, the rotational position of the image capture device 300, the direction of north with respect to the image capture device 300, and the size of the field of view 306 may be used to determine where within the field of view 306 the celestial pole is located. The location of the image capture device 300, the rotational position of the image capture device 300, the direction of north with respect to the image capture device 300, and the size of the field of view 306 may be used to determine where outside the field of view 306 the celestial pole is located.

A graphical user interface may be presented on the electronic display 316. The graphical user interface may include information on the location of the celestial pole within or outside the field of view 306. The graphical user interface may visually indicate where within or outside the field of view the celestial pole is located. Such visual indication may assist the user in framing images/videos with respect to the celestial pole.

Referring back to FIG. 1, the processor 11 (or one or more components of the processor 11) may be configured to obtain information to facilitate capturing visual content using celestial pole. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a sound sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate capturing visual content using celestial pole. The machine-readable instructions 100 may include one or more computer program components. The machine-readable instructions 100 may include one or more of a location component 102, a graphical user interface component 104, and/or other computer program components.

The location component 102 may be configured to determine location of celestial pole with respect to a field of view of an optical element. Determining location of celestial pole with respect to a field of view of an optical element may include ascertaining, computing, establishing, finding, and/or otherwise determining the location of celestial pole with respect to the field of view of the optical element. Determining location of celestial pole with respect to a field of view of an optical element may include determining whether or not the celestial pole is within or outside the field of view of the optical element. Determining location of celestial pole with respect to a field of view of an optical element may include determining where within the field of view the celestial pole is located. Determining location of celestial pole with respect to a field of view of an optical element may include determining where outside the field of view the celestial pole is located. Determining location of celestial pole with respect to a field of view of an optical element may include determining location of the celestial pole with respect to the field of view of the visual content captured through the optical element.

The location of the celestial pole with respect to the field of view of the optical element may be determined based on the location of the image capture device, the direction of north with respect to the image capture device, the rotational position of the image capture device, the size of the field of view, and/or other information. For example, the location of the image capture device on Earth (e.g., GPS coordinates, longitude and latitude coordinates), how the image capture device is oriented with respect to the direction of north, the tilt of the image capture device with respect to the horizon, and the size of the field of view may be used to the position of the celestial pole (e.g., actual celestial pole, North Star) in the field of view of the image capture device. In some implementations, the direction of north with respect to the image capture device may indicate direction of magnetic north with respect to the image capture device. The direction of magnetic north with respect to the image capture device may differ from the direction of geographic north with respect to the image capture device (based on Earth magnetic variations). The direction of magnetic north with respect to the image capture device may be converted into direction of geographic north with respect to the image capture device for use in determining the location of the celestial pole with respect to the field of view of the optical element.

In some implementations, determination of the location of the celestial pole with respect to the field of view of the optical element may include: (1) determination of orientation of the celestial pole with respect to the image capture device based on the location of the image capture device, the direction of north with respect to the image capture device, and/or other information; and (2) determination of the location of the celestial pole with respect to the field of view based on the orientation of the celestial pole with respect to the image capture device, the rotational position of the image capture device, the size of the field of view, and/or other information.

The orientation of the celestial pole with respect to the image capture device may refer to relative position and/or direction of the celestial pole with respect to the image capture device. The orientation of the celestial pole with respect to the image capture device may refer to where the celestial pole is located with respect to how the image capture device is positioned at the location of the image capture device (e.g., the direction in which the image capture device is pointed at the location). The orientation of the celestial pole with respect to the image capture device may be determined based on where on Earth the image capture device is located and how the image capture device is positioned with respect to the direction of north.

Figure 4:
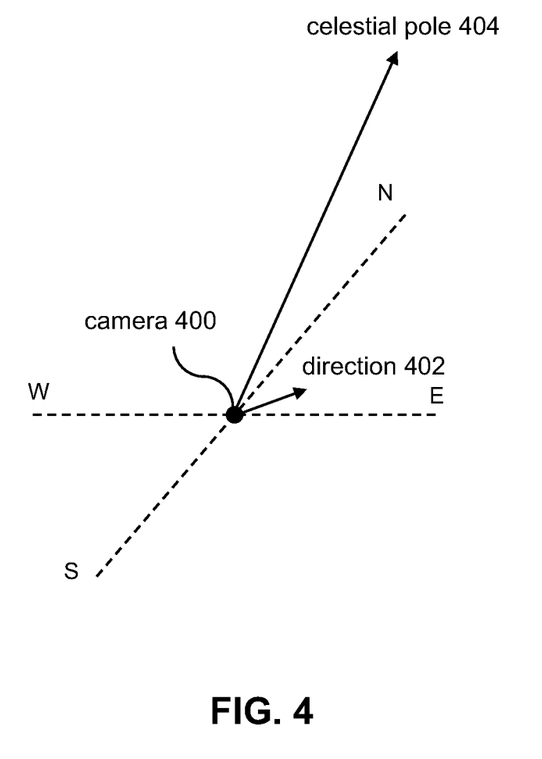
FIG. 4 illustrates an example orientation of celestial pole with respect to a camera.

For example, FIG. 4 illustrates an example orientation of celestial pole 404 with respect to a camera 400. The camera 400 may be pointed in a direction 402. From the location of the camera 400 on Earth, the relative position of the celestial pole 404 from the camera 400, or vice versa, may be determined. Based on the direction of north with respect to the camera 400, the direction 402 in which the camera 400 is pointed may be determined. Based on the relative position of the celestial pole 404 from the camera 400, or vice versa, and the direction 402 in which the camera 400 is pointed, the orientation of the celestial pole 404 with respect to the camera 400 may be determined. For example, the degree by which the celestial pole 404 is above the horizon and the degree by which direction 402 is offset from the direction of the celestial pole 404 may be determined. The direction(s) and the degree(s) by which the celestial pole 404 is offset/away from the center of the field of view of the camera 400 may be determined.

Location of the celestial pole with respect to the field of view may refer to relative position and/or direction of celestial pole with respect to the field of view of the optical element through which visual content is captured and/or with respect to the field of view of the visual content captured through the optical element. Location of the celestial pole with respect to the field of view may refer where within the field of view the celestial pole is location and/or where outside the field of view the celestial pole is located. The location of the celestial pole with respect to the field of view may be determined based on the orientation of the celestial pole with respect to the image capture device, how the image capture device is tilted with respect to the horizon, and the size of the field of view.

Figure 5A:
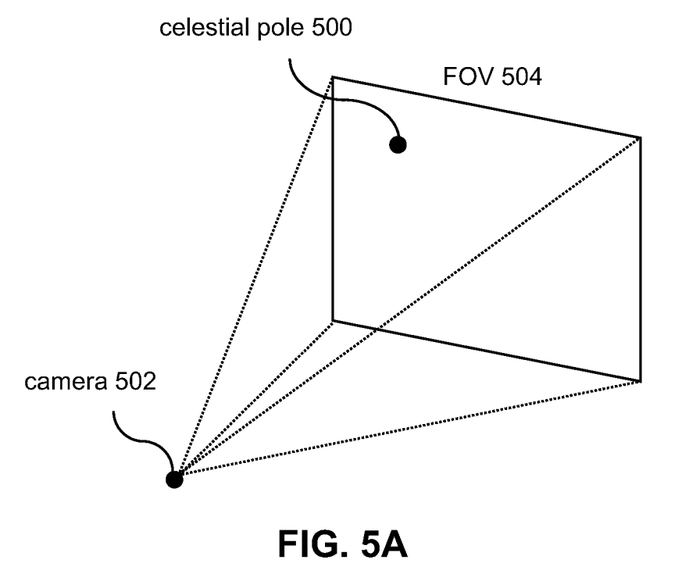
FIGS. 5A and 5B illustrate example locations of celestial pole with respect to field of view of a camera.

For example, FIGS. 5A and 5B illustrate example locations of celestial pole with respect to field of view of a camera 502. Referring to FIG. 5A, a camera 502 may have a field of view 504 having a particular size. The size of the field of view 504 may include the amount and/or shape of a scene captured by the camera 502. The camera 502 may be leveled with respect to the horizon and pointed so that the center of the field of view 504 is below and to the right of the celestial pole 500. The size of the field of view 504 may be large enough to include the celestial pole 500 within the field of view 504.

Figure 5B:
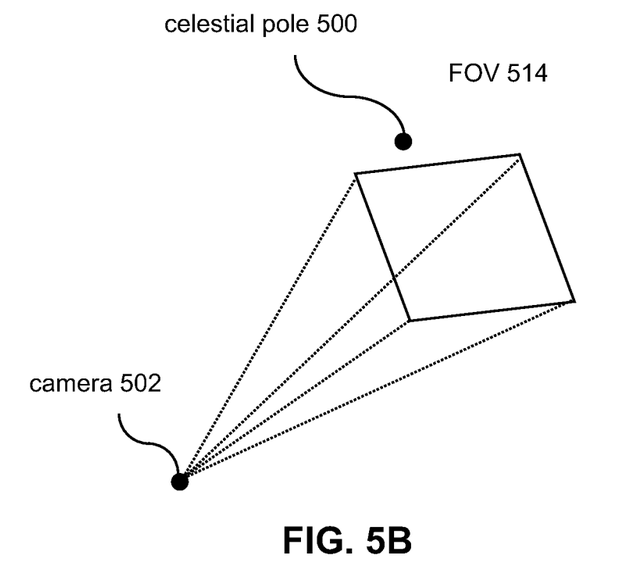

Referring to FIG. 5B, the camera 502 may have a field of view 514 having a particular size. The size of the field of view 514 may be smaller than the size of the field of view 504. The camera 502 may be tilted with respect to the horizon and pointed so that the center of the field of view 514 is below and to the right of the celestial pole 500. The size of the field of view 514 and/or the tilt of the camera 502 may result in the celestial pole 500 being located outside the field of view 514.

While the field of views 504, 514 are shown in FIGS. 5A and 5B as having the same shape, this is merely as an example and is not meant to be limiting. Different fields of view may have different shapes (corresponding to different distortions within captured visual content), have different aspect ratios, and/or cover different angles.

The graphical user interface component 104 may be configured to effectuate presentation of one or more graphical user interfaces on the electronic display 14 and/or other electronic display(s). Effectuating presentation of a graphical user interface on an electronic display may include causing, bringing about, facilitating, and/or otherwise effectuating presentation of the graphical user interface on the electronic display.

A graphical user interface may refer to a user interface that enables a user to interact with the system 10 through one or more interface elements. A graphical user interface may refer to a user interface that enables the system 10 to provide information to a user through one or more interface elements. A graphical user interface may refer to a user interface that enables a user to provide one or more input to the system 10.

A graphical user interface may include interface elements. A graphical user interface may be static or dynamic. A graphical user interface may include a static configuration of interface elements and/or include dynamic configurations of interface elements that changes (e.g., with time, based on user interaction with one or more interface elements). Multiple/different interface elements may be presented/included within a graphical user interface at the same time, may be presented/included within a graphical user interface at different times, and/or may be presented/included within a graphical user interface responsive to user interaction with one or more other interface elements and/or other information.

An interface element of a graphical user interface may refer to a graphical element of the graphical user interface, such as window, icon, button, graphic, and/or other visual indicator. An interface element may visually provide information and/or enable a user to provide inputs to the system 10. For example, an interface element may visually provide information determined by the system 10 and/or a user may interact (e.g., engage, toggle, manipulate) with an interface element to provide one or more input to the system 10. A graphical user interface may facilitate interaction of the user with one or more of the interface elements via the user input received through one or more user interface devices (e.g., touchscreen display, keyboard, mouse, trackpad) and/or other user input. For example, a graphical user interface may present/include the interface elements in a particular arrangement and enable the user to interact with individual interface elements by engaging with locations corresponding to the individual interface elements on a touchscreen display.

The interface elements may include a celestial pole element and/or other interface elements. The celestial pole element may refer to an interface element that provides information on location of the celestial pole within the field of view of the optical element. The celestial pole element may indicate the location of the celestial pole within the field of view of the optical element. The celestial pole element may visually mark the location of the celestial pole within the field of view of the optical element. For example, the graphical user interface may include presentation of visual content captured by the image capture device, and the celestial pole element may be overlaid on top of the visual content. The location of the celestial pole element on top of the visual content may correspond to the location of the celestial pole within the field of view. The celestial pole element may enable a user of the image capture device to frame their shot, such as a starry trail shot, before capturing visual content. A starry trail shot may refer to capture of visual content in which stars move to create trails. For example, celestial pole element may enable a user of the image capture device to frame a starry trail shot with understanding the point around which the stars will rotate and create trails.

In some implementations, the celestial pole element may include a dot or a circle positioned on the visual content to visually represent the location of the celestial pole within the field of view of the optical element. That dot or the circle may represent location of the celestial pole. A dot may provide a more precise indication of the celestial pole location while the circle may provide a less precise indication of the celestial pole location.

In some implementations, the graphical user interface may include a direction element in place of the celestial pole element based on the location of the celestial pole outside the field of view. Based on the celestial pole being located outside the field of view, the graphical user interface may include the direction element rather than the celestial pole element. The direction element may refer to an interface element that provides information on location of the celestial pole outside the field of view of the optical element. The direction element may indicate direction of the location of the celestial pole outside the field of view. For example, the direction element may include an arrow that indicates the direction in which the image capture device should be turned to include the celestial pole within the field of view.

In some implementations, the graphical user interface may further include multiple circle elements of different sizes. A circle element may refer to an interface element with a circular shape. A circle element may refer to an interface element that simulates a star trail. Circle elements of different sizes may simulate star trails from stars that are at different distances from the celestial pole. The multiple circle elements may be centered on the location of the celestial pole within the field of view. The multiple circle elements may be centered on the location of the celestial pole to simulate how multiple star trails may appear in the visual content from the present location/direction of the image capture device. In some implementations, the shape of a circle element may be deformed in accordance with distortion present within the visual content (e.g., distortion of circle to simulate how a circle would be distorted through a wide-view lens).

In some implementations, the graphical user interface may further include simulated star trail elements for stars within the field of view. A simulated star trail element may refer to an interface element that simulates a star trail that would be created by a star within the field of view. A simulated star trail element may include a complete circle or a partial circle to simulate a star trail that would be created by a star within the field of view. A simulated star trail element may be included within the graphical user interface for some of all of the stars detected within the field of view. For example, a simulated star trail element may be included within the graphical user interface for a star having a brightness above a threshold brightness and/or size above a threshold size. The simulated star trail elements may simulate trailing of the stars around the location of the celestial pole within the field of view.

In some implementations, one or more interface elements may be modified based on segmentation of the visual content. Segmentation of the visual content may include locating objects and/or boundaries within the visual content. Segmentation of the visual content may include dividing the visual content into different portions based on what is depicted within the different portions. For example, segmentation of visual content may be performed to segment portion(s) of the visual content depicting the sky from portion(s) of the visual content depicting structures (e.g., trees, buildings, landscape). The interface element(s) may be modified based on which portions of the visual content the interface element(s) are positioned. For example, the circle element(s) and/or the simulated star trail element(s) may be modified so that they are presented on top of the portion(s) that depict the sky while not presented on top of portion(s) that depict structures. Such modification of interface elements may simulate blocking of starry trails by structures and provide the user with more realistic simulation of how the starry trail shot may come out.

FIGS. 6A, 6B, 6C, and 6D illustrates example views of a graphical user interface 600. The views of the graphical user interface in FIGS. 6A, 6B, 6C, and 6D are provided merely as examples, and the arrangement and visual aspects of the graphical user interface may vary depending on the implementation. In some implementations, the graphical user interface may include additional features and/or alternative features. In some implementations, the graphical user interface may not include features shown in FIGS. 6A, 6B, 6C, and 6D. Other graphical user interfaces are contemplated.

Figure 6A:
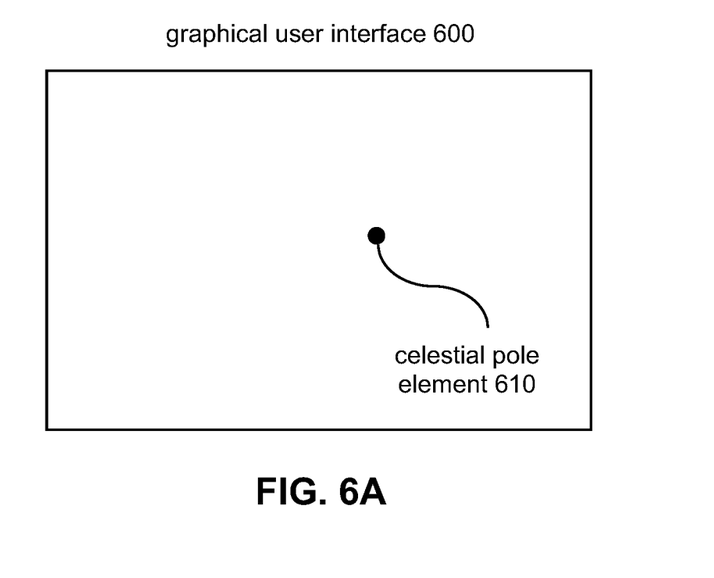
FIGS. 6A, 6B, 6C, and 6D illustrates example views of a graphical user interface.

Referring to FIG. 6A, the graphical user interface 500 may include a celestial pole element 610. The celestial pole element 610 may include a dot. While a circular dot is shown in FIG. 6A, other shapes may be used as the celestial pole element 610. The location of the celestial pole element 610 within the graphical user interface 600 may indicate the location of the celestial pole within the field of view of the image capture device. The celestial pole element 610 may be overlaid on top of visual content captured by the image capture device. The location of the celestial pole element 610 on top of the visual content may correspond to the location of the celestial pole within the visual content.

Figure 6B:
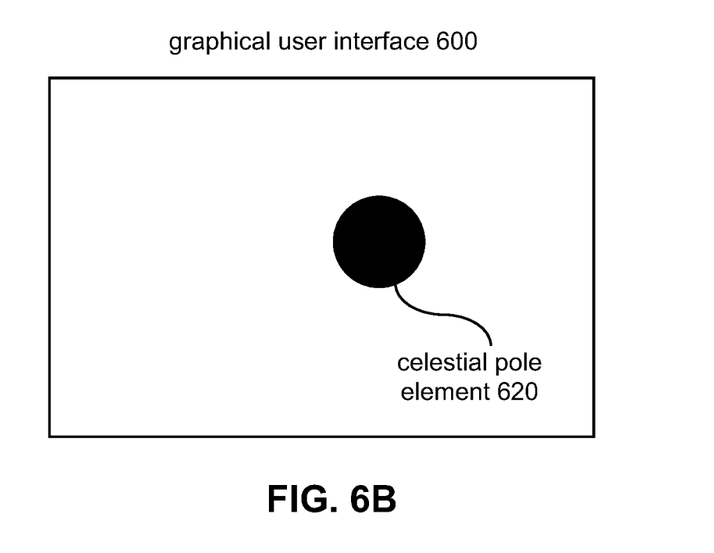

Referring to FIG. 6B, the graphical user interface 600 may include a celestial pole element 620. The celestial pole element 620 may include a circle. While the circle is shown in FIG. 6B without any deformation, the circle may be deformed based on optical characteristics of the optical element (e.g., lens) through which visual content is captured. The circle may be deformed in accordance with distortion in the visual content. The location of the celestial pole element 620 within the graphical user interface 600 may indicate the general/approximate location of the celestial pole within the field of view of the image capture device. The celestial pole element 620 may be overlaid on top of visual content captured by the image capture device. The location of the celestial pole element 620 on top of the visual content may correspond to the general/approximate location of the celestial pole within the visual content.

Figure 6C:
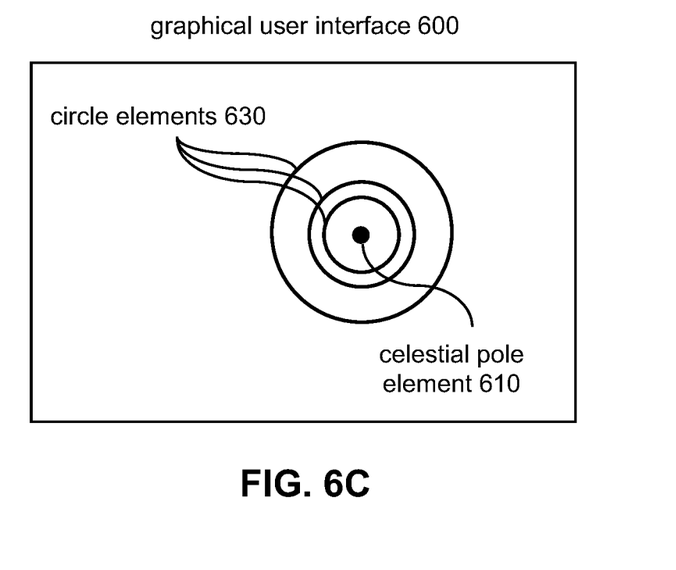

Referring to FIG. 6C, the graphical user interface 600 may include the celestial pole element 610 and circle elements 630. The circle elements 630 may include circles of different sizes. The circle elements 630 may be centered on the location of the celestial pole. The circle elements 630 may simulate how star trails may appear in the visual content based on the location of the celestial pole within the field of view of the image capture device/visual content.

Figure 6D:
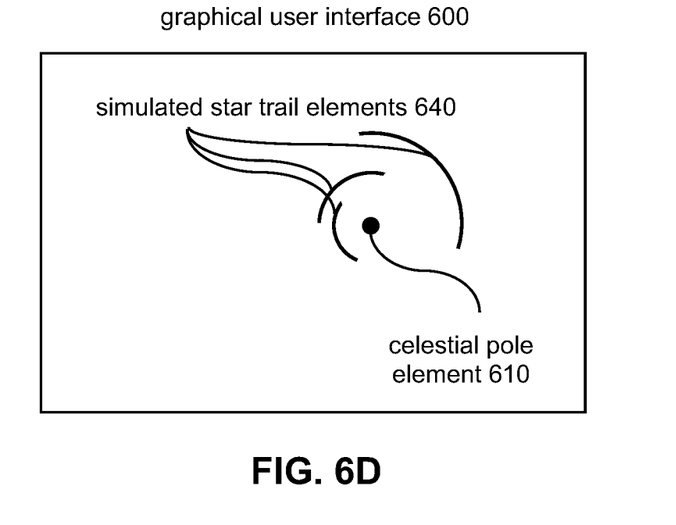

Referring to FIG. 6D, the graphical user interface 600 may include the celestial pole element 610 and simulated star trail elements 640. The simulated star trail elements 640 may simulate star trails that would be created by stars within the field of view of the image capture device/visual content. The simulated star trail elements 640 may grow over time. For example, the simulated star trail elements 640 may start as dots on top of stars and may grow longer over time to simulate star trails that would be captured over time. The brightness and/or the thickness of the simulated star trail elements 640 may be determined based on the source star (star from which the star trails originate). For example, brightness and/or the thickness of the simulated star trail elements 640 may be determined based on brightness and/or size of the stars, so that brighter/larger stars results in brighter/thicker simulated star trail elements 640 while dimmer/smaller stars results in dimmer/thinner simulated star trail elements 640.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
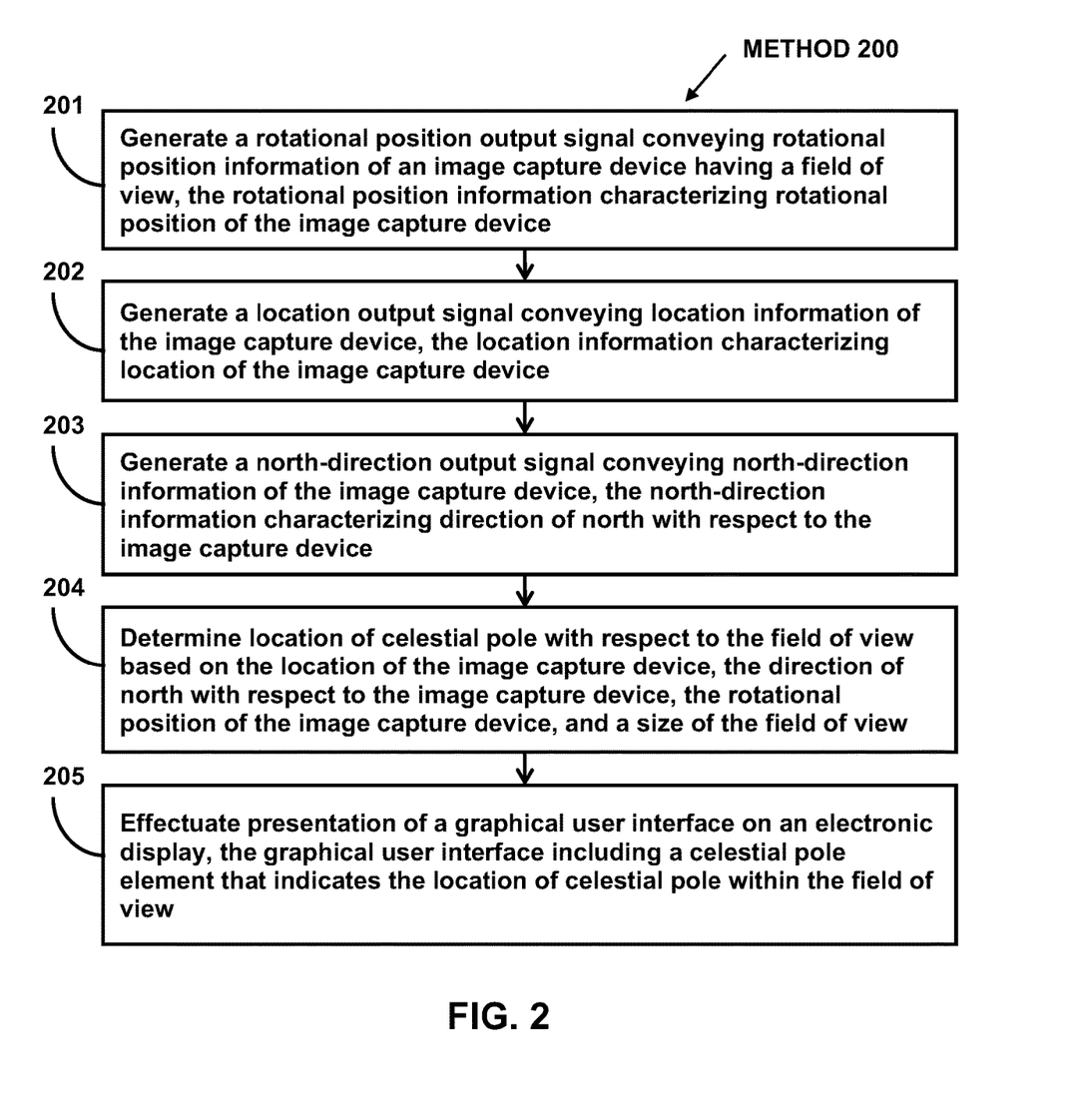
FIG. 2 illustrates an example method for capturing visual content using celestial pole.

FIG. 2 illustrates method 200 for capturing visual content using celestial pole. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include one or more of an electronic display, an image sensor, an optical element, a rotational position sensor, a location sensor, a north-direction sensor, a processor, and/or other components. The image sensor may generate a visual output signal conveying visual information based on light that becomes incident thereon. The visual information may define visual content. The optical element may guide light within a field of view to the image sensor. The field of view may have a size.

At operation 201, a rotational position output signal conveying rotational position information of the image capture device may be generated. The rotational position information may characterize rotational position of the image capture device. In some implementations, operation 201 may be performed by a component the same as or similar to the rotational position sensor 15 (Shown in FIG. 1 and described herein).

At operation 202, a location output signal conveying location information of the image capture device may be generated. The location information may characterize location of the image capture device. In some implementations, operation 202 may be performed by a component the same as or similar to the location sensor 16 (Shown in FIG. 1 and described herein).

At operation 203, a north-direction output signal conveying north-direction information of the image capture device may be generated. The north-direction information may characterize direction of north with respect to the image capture device. In some implementations, operation 203 may be performed by a component the same as or similar to the north-direction sensor 17 (Shown in FIG. 1 and described herein).

At operation 204, location of celestial pole with respect to the field of view may be determined based on the location of the image capture device, the direction of north with respect to the image capture device, the rotational position of the image capture device, the size of the field of view, and/or other information. In some implementations, operation 204 may be performed by a processor component the same as or similar to the location component 102 (Shown in FIG. 1 and described herein).

At operation 205, presentation of a graphical user interface on the electronic display may be effectuated. The graphical user interface may include a celestial pole element that indicates the location of celestial pole within the field of view. In some implementations, operation 205 may be performed by a processor component the same as or similar to the graphical user interface component 104 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for capturing visual content using celestial pole, the image capture device comprising:
    a housing;
    an electronic display carried by the housing and configured to present information;
    an image sensor carried by the housing and configured to generate a visual output signal conveying visual information based on light that becomes incident thereon, the visual information defining the visual content;

an optical element carried by the housing and configured to guide light within a field of view to the image sensor, the field of view having a size;

a rotational position sensor carried by the housing and configured to generate a rotational position output signal conveying rotational position information, the rotational position information characterizing rotational position of the housing, wherein the rotational position sensor includes an accelerometer, a gyroscope, or an inertial measurement unit;

a location sensor carried by the housing and configured to generate a location output signal conveying location information, the location information characterizing location of the housing, wherein the location sensor includes a Global Positioning System sensor;

a north-direction sensor carried by the housing and configured to generate a north-direction output signal conveying north-direction information, the north-direction information characterizing direction of north with respect to the housing, wherein the north-direction sensor includes a magnetometer; and one or more physical processors carried by the housing and configured by machine-readable instructions to:

determine location of the celestial pole with respect to the field of view based on the location of the housing, the direction of north with respect to the housing, the rotational position of the housing, and the size of the field of view; and effectuate presentation of a graphical user interface on the electronic display, the graphical user interface including a celestial pole element that indicates the location of the celestial pole within the field of view.

2. The image capture device of claim 1, wherein the graphical user interface further includes multiple circle elements of different sizes or simulated star trail elements for stars within the field of view, the multiple circle elements centered on the location of the celestial pole within the field of view, the simulated star trail elements simulating trailing of the stars around the location of the celestial pole within the field of view.

3. An image capture device for capturing visual content using celestial pole, the image capture device comprising:

a housing;

an electronic display carried by the housing and configured to present information;

an image sensor carried by the housing and configured to generate a visual output signal conveying visual information based on light that becomes incident thereon, the visual information defining the visual content;

an optical element carried by the housing and configured to guide light within a field of view to the image sensor, the field of view having a size;

a rotational position sensor carried by the housing and configured to generate a rotational position output signal conveying rotational position information, the rotational position information characterizing rotational position of the housing;

a location sensor carried by the housing and configured to generate a location output signal conveying location information, the location information characterizing location of the housing;

a north-direction sensor carried by the housing and configured to generate a north-direction output signal conveying north-direction information, the north-direction information characterizing direction of north with respect to the housing; and one or more physical processors carried by the housing and configured by machine-readable instructions to:

determine location of the celestial pole with respect to the field of view based on the location of the housing, the direction of north with respect to the housing, the rotational position of the housing, and the size of the field of view; and effectuate presentation of a graphical user interface on the electronic display, the graphical user interface including a celestial pole element that indicates the location of the celestial pole within the field of view.

4. The image capture device of claim 3, wherein determination of the location of the celestial pole with respect to the field of view includes:

determination of orientation of the celestial pole with respect to the housing based on the location of the housing and the direction of north with respect to the housing; and determination of the location of the celestial pole with respect to the field of view based on the orientation of the celestial pole with respect to the housing, the rotational position of the housing, and the size of the field of view.

5. The image capture device of claim 3, wherein the rotational position sensor includes an accelerometer, a gyroscope, or an inertial measurement unit.

6. The image capture device of claim 3, wherein the location sensor includes a Global Positioning System sensor.

7. The image capture device of claim 3, wherein the north-direction sensor includes a magnetometer.

8. The image capture device of claim 3, wherein the celestial pole element includes a dot or a circle positioned on the visual content to visually represent the location of the celestial pole within the field of view.

9. The image capture device of claim 3, wherein the graphical user interface includes a direction element in place of the celestial pole element based on the location of the celestial pole outside the field of view, the direction element indicating direction of the location of the celestial pole outside the field of view.

10. The image capture device of claim 3, wherein the graphical user interface further includes multiple circle elements of different sizes, the multiple circle elements centered on the location of the celestial pole within the field of view.

11. The image capture device of claim 3, wherein the graphical user interface further includes simulated star trail elements for stars within the field of view, the simulated star trail elements simulating trailing of the stars around the location of the celestial pole within the field of view.

12. A method for capturing visual content using celestial pole, the method performed by an image capture device including one or more processors, an electronic display, an image sensor configured to generate a visual output signal conveying visual information based on light that becomes incident thereon, the visual information defining the visual content, an optical element configured to guide light within a field of view to the image sensor, the field of view having a size, a rotational position sensor configured to generate a rotational position output signal conveying rotational position information, the rotational position information characterizing rotational position of the image capture device, a location sensor configured to generate a location output signal conveying location information, the location information characterizing location of the image capture device, and a north-direction sensor configured to generate a north-direction output signal conveying north-direction information, the north-direction information characterizing direction of north with respect to the image capture device, the method comprising:
- determining, by the image capture device, location of the celestial pole with respect to the field of view based on the location of the image capture device, the direction of north with respect to the image capture device, the rotational position of the image capture device, and the size of the field of view; and
- effectuating, by the image capture device, presentation of a graphical user interface on the electronic display, the graphical user interface including a celestial pole element that indicates the location of the celestial pole within the field of view.

13. The method of claim 12, wherein determining the location of the celestial pole with respect to the field of view includes:
- determining orientation of the celestial pole with respect to the image capture device based on the location of the image capture device and the direction of north with respect to the image capture device; and
- determining the location of the celestial pole with respect to the field of view based on the orientation of the celestial pole with respect to the image capture device, the rotational position of the image capture device, and the size of the field of view.

14. The method of claim 12, wherein the rotational position sensor includes an accelerometer, a gyroscope, or an inertial measurement unit.

15. The method of claim 12, wherein the location sensor includes a Global Positioning System sensor.

16. The method of claim 12, wherein the north-direction sensor includes a magnetometer.

17. The method of claim 12, wherein the celestial pole element includes a dot or a circle positioned on the visual content to visually represent the location of the celestial pole within the field of view.

18. The method of claim 12, wherein the graphical user interface further a direction element in place of the celestial pole element based on the location of the celestial pole outside the field of view, the direction element indicating direction of the location of the celestial pole outside the field of view.

19. The method of claim 12, wherein the graphical user interface further includes multiple circle elements of different sizes, the multiple circle elements centered on the location of the celestial pole within the field of view.

20. The method of claim 12, wherein the graphical user interface further includes simulated star trail elements for stars within the field of view, the simulated star trail elements simulating trailing of the stars around the location of the celestial pole within the field of view.

* * * * *